Jan. 22, 1957    R. S. MOORE    2,778,334
CATTLE HOLDING GATE
Filed March 1, 1955
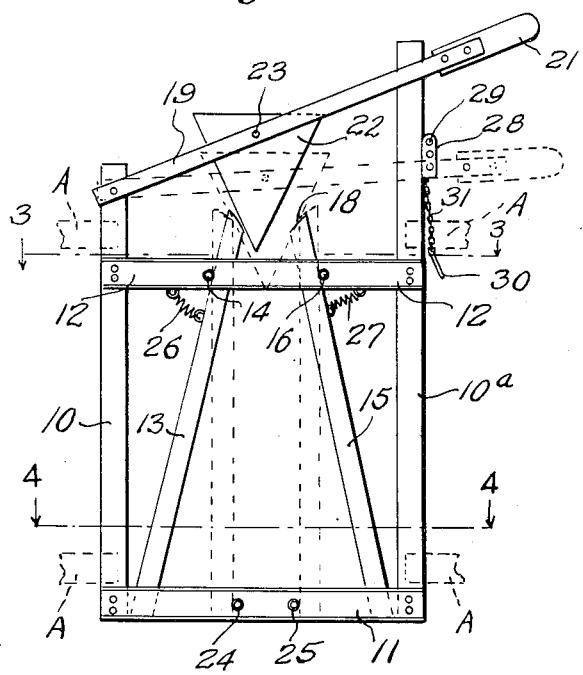
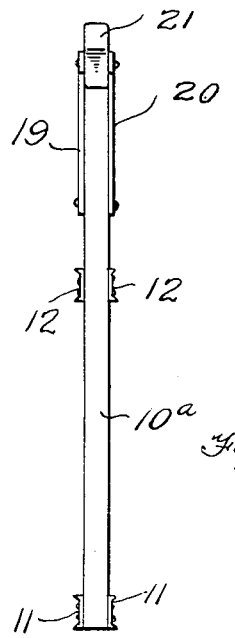
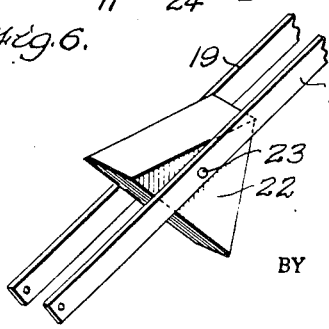
INVENTOR
RICHARD S. MOORE
BY
HIS ATTORNEY

United States Patent Office 2,778,334
Patented Jan. 22, 1957

2,778,334

CATTLE HOLDING GATE

Richard S. Moore, Garrison, Tex.

Application March 1, 1955, Serial No. 491,270

1 Claim. (Cl. 119—98)

This invention relates to a cattle holding gate, and has for one of its objects the production of a simple and efficient cattle holding gate which is easily operated and which may be easily attached to the end of a conventional cattle chute.

A further object of this invention is the production of a simple and efficient cattle gate wherein the holding clamps or clamping members are actuated by a wedge member which is forced therebetween to hold the clamps or clamping members in a clamping position.

Other objects and advantages of the present invention will appear throughout the following specification and claim.

In the drawing:

Figure 1 is a front elevational view of the cattle holding gate;

Figure 2 is a side view thereof;

Figure 3 is a horizontal sectional view taken on line 3—3 of Figure 1;

Figure 4 is a horizontal sectional view taken on line 4—4 of Figure 1;

Figure 5 is an enlarged fragmentary vertical sectional view of the gate, showing the actuating wedge in a lowered position upon the frame;

Figure 6 is a fragmentary perspective view of the actuating wedge and supporting arms;

Figure 7 is a fragmentary transverse sectional view illustrating the pin which limits the upward swing of the wedge supporting arms.

By referring to the drawing in detail, it will be seen that 10 and 10$^a$ designate the two vertical side bars of the gate which are connected at their lower ends by means of a pair of lower spaced horizontal cross bars 11. A pair of upper spaced horizontal cross bars 12 connect the side bars 10 and 10$^a$ near their upper ends. The side bar 10$^a$ is preferably of a greater heighth than the side bar 10, as shown in Figure 1.

A holding clamp 13 is hinged near its upper end upon a journal pin 14 between the cross bars 12, and a holding clamp 15 is hinged near its upper end upon a journal pin 16 between the cross bars 12. The pins 14 and 16 are carried by the cross bars 12. The upper ends or upwardly extending portions of the holding clamps 13 and 15 extend above the cross bars 12 and are beveled outwardly and upwardly at the upper extremity thereof as at 17 and 18, respectively. The pins 14 and 16 are spaced so as to support the holding clamps 13 and 15 in spaced relation.

A pair of spaced parallel wedge supporting arms 19 and 20 are pivotally secured at their inner ends to the side bar 10 near the upper end thereof, and the outer ends of these arms 19 and 20 extend upon opposite sides of the side bar 10$^a$. A handle 21 is carried between the extremities of these arms 19 and 20 beyond the side bar 10$^a$. The upper end of the side bar 10$^a$ acts as a guide for the arms 19 and 20 as these arms are swung upwardly and downwardly. An actuating wedge 22 is pivotally mounted between the arms 19 and 20 upon a journal pin 23 in a manner so that its apex depends from the arms and normally hangs in spaced relation with the upper ends of the holding clamps 13 and 15, as is shown in Figure 1. A pair of spaced abutment pins or members 24 and 25 are carried by the lower cross bars 11 to limit the inward swing of the lower ends of the holding clamps 13 and 15 which may be swung toward and away from each other. Coil springs 26 and 27 engage the respective clamps 13 and 15 at their inner ends and are anchored in any desired manner to the cross bars 12 at their opposite ends to return the holding clamps to an open position when released.

The lower cross bars 11 are spaced and the lower ends of the holding clamps 13 and 15 swing toward and away from each other between the bars 11, the bars 11 constituting a guide for said lower ends of the holding clamps 13 and 15.

A locking plate 28 having vertically aligned apertures 29 is carried near the upper end of the side bar 10$^a$, and a locking pin 30 is flexibly connected to the plate 28 by means of a chain or other similar connection 31.

The operation of the gate is as follows:

An animal's head, such as a cow's head, is extended between the holding clamps 13 and 15 while the clamps are in an open or diverging position, shown in full lines. The arms 19 and 20 are then swung downwardly from the full line position shown in Figure 1 to the dotted line position. The depending apex of the actuating wedge contacts the upper ends of the clamps 13 and 15 and moves these clamps to the dotted line positions in abutting relation with the pins 24 and 25 so that the clamps extend in vertical parallel relation. The abutment pins 24 and 25 limit the amount of swing of the clamps in a direction toward each other and the clamps in this manner hold the head of the animal in a clamped position. The pin 30 is passed through a selected aperture of the plate 28 so as to rest upon the top faces of the arms 19 and 20 in the manner shown in Figure 7. This pin 30 will hold the arms 19 and 20 in a lowered position where the actuating wedge 22 wedges between the upper ends of the clamps 13 and 15, in the dotted line position shown in Figure 1, to hold the clamps 13 and 15 in a closed position, or locked position. When the arms 19 and 20 are swung upwardly the wedge will be raised to release the holding clamps 13 and 15 and the springs 26 and 27 will automatically swing the holding clamps to the open position, shown in full lines.

The gate may be connected in any conventional manner to a cattle chute or other support, by any suitable means such for instance by means of the elements A shown in dotted lines in Figure 1.

It should be understood that certain detail changes in the construction and arrangement of parts may be employed without departing from the function of the invention, so long as such changes fall within the scope of the appended claim.

Having described the invention, what I claim as new is:

A cattle holding gate of the class described comprising a frame, a cross bar carried by said frame, a pair of holding clamps hinged to said cross bar in spaced relation near their upper ends and having upwardly extending portions, each upwardly extending portion being beveled outwardly and upwardly at the upper extremity thereof, an actuating wedge, a supporting arm pivotally supported upon said frame, means for pivotally supporting said actuating wedge upon said arm above the upper ends of said holding clamps, a guide for the lower ends of said holding clamps carried by said frame, means for limiting the swing of said lower ends of said holding clamps in said guide, means for yieldably holding the lower ends of said holding clamps in a spread-apart position and their upper ends in an inwardly swung position toward each other, said actuating wedge tapering downwardly between said upper ends of said holding clamps and being movable into contact with said beveled extremities of said upper ends of said holding clamps to force said upper ends apart and to thereby swing said lower ends together to a closed position as said arm is swung downwardly to force said wedge between said upper ends of said holding clamps.

References Cited in the file of this patent

UNITED STATES PATENTS

| | | |
|---|---|---|
| 175,152 | Phillips | Mar. 21, 1876 |
| 194,652 | Corbin | Aug. 28, 1877 |
| 1,223,126 | Troxell | Apr. 17, 1917 |